(12) United States Patent
Kobayashi et al.

(10) Patent No.: US 7,767,328 B2
(45) Date of Patent: Aug. 3, 2010

(54) FUEL CELL OPTIMUM OPERATION POINT TRACKING SYSTEM IN POWER SUPPLY DEVICE USING FUEL CELL AND POWER SUPPLY DEVICE PROVIDED WITH THIS FUEL CELL OPTIMUM OPERATION POINT TRACKING SYSTEM

(75) Inventors: Kimiyoshi Kobayashi, Saitama (JP); Yutaka Sekine, Saitama (JP); Hideki Fujimoto, Kumamoto (JP); Tetsuji Kitamori, Kumamoto (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 1456 days.

(21) Appl. No.: 10/535,192

(22) PCT Filed: Jul. 28, 2004

(86) PCT No.: PCT/JP2004/010724

§ 371 (c)(1),
(2), (4) Date: May 18, 2005

(87) PCT Pub. No.: WO2005/031401

PCT Pub. Date: Feb. 10, 2005

(65) Prior Publication Data

US 2006/0029844 A1     Feb. 9, 2006

(30) Foreign Application Priority Data

Aug. 1, 2003    (JP) .............................. 2003-285196

(51) Int. Cl.
*H01M 8/04*    (2006.01)
(52) U.S. Cl. ....................................................... 429/22
(58) Field of Classification Search ................... 429/12, 429/13, 22, 23, 24
See application file for complete search history.

(56) References Cited

U.S. PATENT DOCUMENTS

2002/0162694 A1    11/2002    Iwasaki

FOREIGN PATENT DOCUMENTS

GB    2281642 A    3/1995

(Continued)

OTHER PUBLICATIONS

International Search Report (Japanese) for PCT/JP2004/010724 mailed on Oct. 19, 2004.

(Continued)

*Primary Examiner*—Patrick Ryan
*Assistant Examiner*—Monique Wills
(74) *Attorney, Agent, or Firm*—Ditthavong Mori & Steiner, P.C.

(57) ABSTRACT

The present invention provides a fuel cell optimum operating point tracking system capable of ensuring optimum operation of a fuel cell, by detecting the optimum operation voltage of the fuel cell taking not only temperature dependence of the output characteristics thereof, but also chemical reactions into consideration. The fuel cell optimum operating point tracking system is configured so as to vary a voltage of a fuel cell (1) output upon activation of a power source device (2) up to as high as a maximum voltage for the maximum power point tracking control by the fuel cell output voltage variation command unit (11), to measure the power state using a fuel cell output power measuring unit (12), to monitor the output power measured by the fuel cell output power measuring unit using a fuel cell maximum power point judging unit (13) to thereby judge the maximum power point of the output voltage of the fuel cell, and to track an optimum operating point through maximum power monitoring to thereby keep the power source operation constant at a stable condition using an optimum operating point variation command unit (15), and additionally giving a minimal voltage change at around the current operating voltage value.

19 Claims, 14 Drawing Sheets

FOREIGN PATENT DOCUMENTS

| | | |
|---|---|---|
| JP | 09-245826 A | 9/1997 |
| JP | 11-026002 A | 1/1999 |
| JP | 2002-171671 A | 6/2002 |
| JP | 2003-086211 A | 3/2003 |
| JP | 2004-362946 A | 12/2004 |

OTHER PUBLICATIONS

International Search Report (English) for PCT/JP2004/010724 mailed on Oct. 19, 2004.

Supplementary European Search Report of Application No. 04770987 completed on Apr. 22, 2009 (EPO).

European Office Action for corresponding EP Application No. 04 770 987.8, Apr. 9, 2010.

FUEL CELL OPTIMUM OPERATION POINT TRACKING SYSTEM IN POWER SUPPLY DEVICE USING FUEL CELL AND POWER SUPPLY DEVICE PROVIDED WITH THIS FUEL CELL OPTIMUM OPERATION POINT TRACKING SYSTEM

FIELD OF THE INVENTION

The present invention relates to a power source device for obtaining a desired power of a fuel cell, and in particular to a fuel cell optimum operating point tracking system used for the power source device, making it possible to constantly supply a maximum output power from the fuel cell even under variable external environment, such as temperature, around the site where the fuel cell is installed.

RELATED ART

There is known a conventional optimum operating point tracking circuit of a DC/DC converter, typically as shown in FIG. 20, aiming at supplying a large as possible electric power corresponding to power generation state of the fuel cell, which uses a fixed voltage arbitrarily set while preliminarily predicting so that the output voltage of a fuel cell DMFC, connected as an input power source of the device, can be maximized (see Patent Document 1, for example).

[Patent Document 1] Japanese Laid-Open Patent Publication "Tokkaihei" No. 11-341699

DISCLOSURE OF THE INVENTION

Subjects to be Solved by the Invention

In this case, it is however impossible to track the optimum operation voltage for the maximum power supply which shifts in the positive direction due to ambient temperature of the fuel cell or heat generation in association with the power generation.

It is also typically anticipated that a plurality of maximum power peak values may be permissible, because state of power generation by the fuel cell largely varies depending not only on temperature, but also on, for example, chemical reaction of a fuel used for the fuel cell. In this case, the power peak with respect to load current may vary, and this may raise a problem in that any initial point of observation will no more be a maximum power peak, so that an observed peak value may be misunderstood as the maximum power, despite a real maximum power resides elsewhere in other peak.

The present invention was conceived considering the above-described problems, and is to provide a power source device using a fuel cell, capable of ensuring an optimum operation of the fuel cell by detecting the optimum operation voltage taking not only temperature dependence of the output characteristics, but also chemical reactions into consideration.

SUMMARY OF THE INVENTION

According to the present invention aimed at solving the above-described problems, there is provided a fuel cell optimum operating point tracking system used in a power source device powered by a fuel cell, configured so as to improve the responsiveness thereof by monitoring the power state while varying the output voltage of the fuel cell, and by allowing the fuel cell to start operation at an input voltage corresponded to a maximum power point thereof, comprising: a fuel cell maximum power search function; and a fuel cell optimum operating point tracking function capable of tracking an optimum operating point through maximum power monitoring, by allowing the fuel cell maximum power search function to operate so as to monitor the power state to thereby keep the power source operation constant at a stable condition, and additionally giving a minimal voltage change at around the current operating voltage value.

The fuel cell maximum power search function comprises a fuel cell output voltage variation command unit capable of varying the output voltage of the fuel cell upon activation thereof up to as high as the maximum voltage for the maximum power point tracking control.

The fuel cell output voltage variation command unit is configured as having a maximum command voltage and a minimum command voltage set therein, and so as to vary an initial command voltage output upon activation of the fuel cell up to the maximum command voltage, and so as to further vary the maximum command voltage down to the minimum command voltage.

The fuel cell maximum power search function comprises a fuel cell output power measuring unit capable of measuring the power state of the fuel cell by varying the output voltage upon activation thereof.

The fuel cell maximum power search function comprises a fuel cell maximum power point judging-and-storing unit capable of monitoring the output power of the fuel cell upon activation thereof, and of judging the maximum power point of the output voltage of the fuel cell. The fuel cell maximum power point judging-and-storing unit is configured so as to judge a voltage under which the command voltage becomes maximum within a range of the successive detection as the maximum power point, when the maximum power point is successively detected despite the command voltage is varied.

The fuel cell maximum power search function comprises a timer having a specified voltage refreshing interval set therein, configured so as to measure the power state by clearing, after the elapse of the specified voltage refreshing interval, the stored values of the fuel cell output voltage maximum point and the output voltage corresponded thereto upon activation of the fuel cell, and by varying the output voltage of the fuel cell up to as high as the maximum voltage for the maximum power point tracking control.

In another configuration, the fuel cell maximum power search function comprises a power source activation detecting unit capable of measuring the power state by varying the output voltage of the fuel cell upon activation thereof up to as high as the maximum voltage for the maximum power point tracking control.

The fuel cell maximum power search function comprises an optimum operating point variation command unit capable of tracking the optimum operation point, by monitoring the power state at the fuel cell output power maximum point upon activation of the fuel cell, and by effecting the maximum power monitoring through additionally giving a minimal voltage change at around the current operating voltage value.

The fuel cell optimum operating point tracking function comprises a fuel cell output voltage variation command unit capable of varying the output voltage upon being activated by the fuel cell maximum power search function up to as high as the maximum voltage for the maximum power point tracking control.

The fuel cell optimum operating point tracking function comprises a fuel cell output power measuring unit capable of measuring the power state by varying the output voltage upon being activated by the fuel cell maximum power search function.

The fuel cell optimum operating point tracking function comprises a fuel cell maximum power point judging-and-storing unit capable of monitoring the output voltage upon being activated by said fuel cell maximum power search function, and judging the maximum power point of the output voltage of the fuel cell.

The fuel cell maximum power point judging-and-storing unit is configured so as to judge a voltage under which the command voltage becomes maximum within a range of the successive detection as the maximum power point, when the maximum power point is successively detected despite the command voltage is varied.

The fuel cell optimum operating point tracking function comprises a timer unit having a specified voltage refreshing interval set therein, configured so as to measure the power state by clearing, after every elapse of the specified voltage refreshing interval, the stored values of the fuel cell output voltage maximum point and the output voltage corresponded thereto upon being activated by the fuel cell maximum power search function, and by varying the output voltage of the fuel cell up to as high as the maximum voltage for the maximum power point tracking control.

The fuel cell optimum operating point tracking function comprises an optimum operating point variation command unit capable of tracking the optimum operating point, by monitoring the power state at the fuel cell output power maximum point upon activation with the aid of the fuel cell maximum power search function to thereby keep the power source operation constant at a stable condition, and by effecting the maximum power monitoring through additionally giving a minimal voltage change at around the current operating voltage value.

The fuel cell optimum operating point tracking system further comprises an intermittent operation preventive function capable of monitoring, during the operation of the power source device, the output voltage of the fuel cell, and of outputting an output interruption voltage, upon lowering of the fuel cell output voltage to as low as the fuel cell output interruption voltage or below, to thereby turn the power source device into interruption state.

The intermittent operation preventive function comprises a fuel cell output voltage measuring unit capable of measuring the fuel cell output voltage during operation of the fuel cell optimum operating point tracking function.

The intermittent operation preventive function comprises a fuel cell output interruption judging unit capable of judging whether output of the fuel cell should be interrupted or not, when the fuel cell output voltage drops to the fuel cell output interruption voltage or below during operation of the fuel cell optimum operating point tracking function.

The intermittent operation preventive function comprises a timer unit capable of controlling the intermittent operation when output of the fuel cell is interrupted during operation of the fuel cell optimum operating point tracking function.

The timer unit is configured so as to interrupt the fuel cell, to set a restart wait time, to measure the output voltage of the fuel cell after the elapse of the restart wait time, and to output an operation output signal if the voltage reaches or exceeds the restart voltage to thereby activate the fuel cell.

The intermittent operation preventive function comprises a fuel cell output start judging unit capable of judging whether restart of the fuel cell interrupted during the operation of the fuel cell optimum operating point tracking function is allowable or not.

The fuel cell optimum operating point tracking system further comprises a fuel cell optimum operating point tracking and retaining function capable of widening the specified voltage refreshing interval, when variation in the output voltage of the fuel cell falls below the amount of variation of set voltage within a predetermined time period.

The fuel cell optimum operating point tracking and retaining function comprises a fuel cell optimum operating point tracking unit having the fuel cell maximum power search function and the fuel cell optimum operating point tracking function.

The fuel cell optimum operating point tracking and retaining function comprises a fuel cell output voltage control value variation judging unit capable of judging whether the output voltage variation of the fuel cell falls below, or exceeding the amount of variation of set voltage within a predetermined time period.

The fuel cell optimum operating point tracking and retaining function comprises a timer unit capable of operating so as to activate the fuel cell optimum operating point tracking unit, by widening the specified voltage refreshing interval, if the output voltage variation of the fuel cell falls below the amount of variation of set voltage within a predetermined time period, and by initializing the specified voltage refreshing interval, if the output voltage variation of the fuel cell exceeds the amount of variation of set voltage within a predetermined time period.

The fuel cell optimum operating point tracking and retaining function is configured so as to set a reference unit time, to count the number of times the output voltage variation of the fuel cell falls below the amount of variation of set voltage within every reference unit time, and to determine the state of fall below the amount of variation of set voltage within the predetermined time period by the fact that a specified number of count has successively been met.

The fuel cell optimum operating point tracking and retaining function comprises a counter capable of setting the reference unit time, and of counting the fact that the output voltage variation of the fuel cell falls below the amount of variation of set voltage within every reference unit time.

According to the present invention, there is also provided a power source unit comprising the fuel cell optimum operating point tracking system of the present invention, the fuel cell optimum operating point tracking system being used in a power source device powered by a fuel cell, configured so as to improve the responsiveness thereof by monitoring the power state while varying the output voltage of the fuel cell, and by allowing the fuel cell to start operation at an input voltage corresponded to a maximum power point thereof, comprising: a fuel cell maximum power search function; and a fuel cell optimum operating point tracking function capable of tracking an optimum operating point through maximum power monitoring, by allowing the fuel cell maximum power search function to periodically operate so as to monitor the power state to thereby keep the power source operation constant at a stable condition, and additionally giving a minimal voltage change at around the current operating voltage value.

According to the present invention, it is made possible to track variable operation voltage of a fuel cell capable of supplying a maximum output power, taking temperature changes and chemical reactions into consideration, by monitoring the power state while varying the output voltage of the fuel cell upon activation thereof, and by allowing the fuel cell to start operation at a voltage corresponded to the maximum power point.

It is also made possible to realize a stable power supply from the fuel cell, by monitoring the power state while periodically varying the output voltage of the fuel cell, and by allowing the fuel cell to start operation at a voltage corresponded to the maximum power point thereof.

By equipping the fuel cell maximum power search function with a power source activation detecting unit capable of measuring the power state while varying the output voltage of the fuel cell upon activation thereof up to as high as the maximum voltage for the maximum power point tracking control, it is no more necessary to clear a stored value of the maximum point of the fuel cell output power and the output voltage corresponded thereto upon activation of the fuel cell for every specified voltage refreshing interval, and to measure the power state while varying the output voltage of the fuel cell up to as high as the maximum voltage for the maximum power point tracking control, and it is made possible to measure the operation point to be defined as the maximum power point even under a power restriction by a load.

By providing the intermittent operation preventive function capable of monitoring the fuel cell output voltage during operation of the power source device, and of turning the fuel cell into an interruption state by outputting an interruption output signal when the voltage falls below the fuel cell output interruption voltage, it is made possible to control the duration of time of the intermittent oscillation, and to realize a stable power supply from the fuel cell.

Because the setting is made so as to widen the specified voltage refreshing interval when the output voltage variation of the fuel cell falls below the amount of variation of set voltage within a predetermined time period, it is also made possible to stabilize the operation state even if the number of times of the maximum operation point tracking is reduced.

BRIEF DESCRIPTION OF THE DRAWINGS

The above and other objects, advantages and features of the present invention will be more apparent from the following description taken in conjunction with the accompanying drawings, in which.

Figure 1:
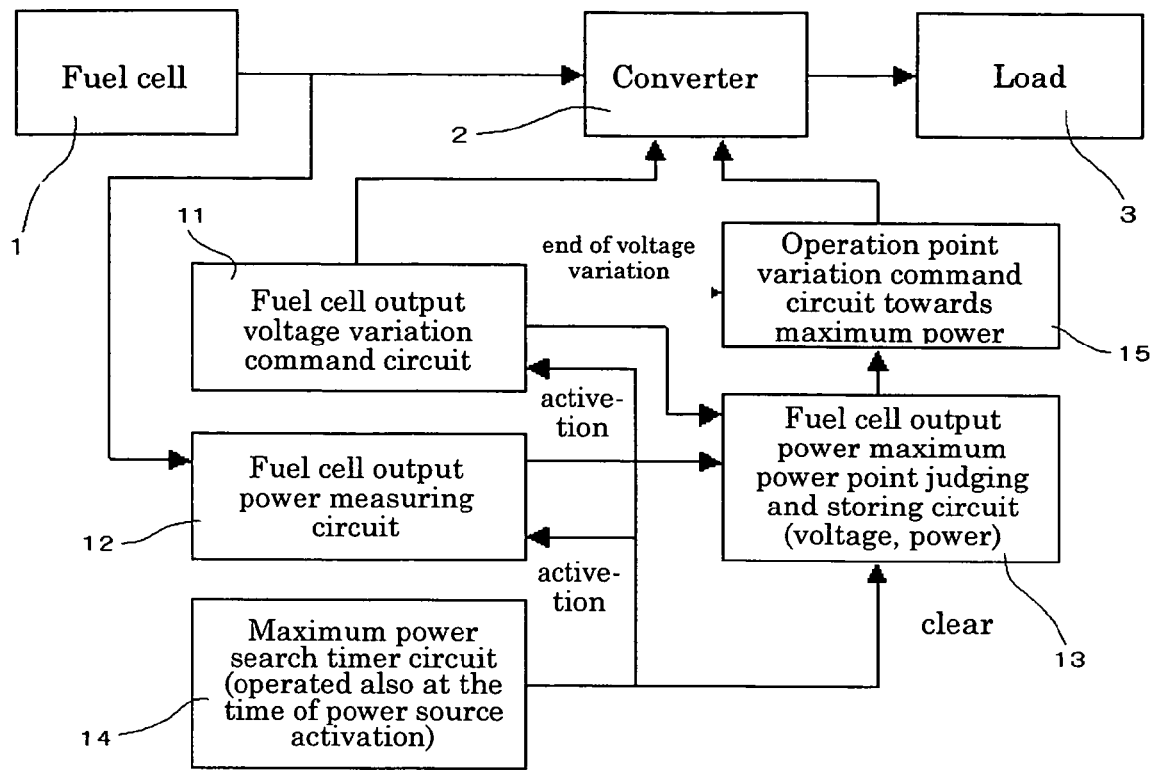
FIG. 1 is a block diagram showing a best mode of a power source device for carrying out the present invention.

EXPLANATION OF THE MARKS 1 fuel cell
2 converter
3 load
11 fuel cell output voltage variation command circuit
12 fuel cell output power measuring circuit
13 fuel cell output power maximum power point judging and storing circuit
14 timer circuit
15 operation point variation command circuit
16 power source activation detecting circuit
21 fuel cell output voltage measuring circuit
22 fuel cell output interruption judging circuit
23 timer circuit
24 fuel cell output start judging circuit
31 optimum operation point tracking circuit
32 fuel cell output voltage control value variation detecting circuit
33 counter
34 timer circuit

DETAILED DESCRIPTION OF THE PREFERRED EMBODIMENTS

A block diagram of a best mode for carrying out the present invention is shown in FIG. 1. A power source device is shown in FIG. 1 as an example wherein a DC-DC converter 2 is used as the power source device connected to a fuel cell 1. The power source device has a load 3 connected on the output side thereof. The power source device has a fuel cell optimum operating point tracking system, and connected to a converter 2.

The fuel cell optimum operating point tracking system comprises a fuel cell maximum power search function and a fuel cell optimum operating point tracking function. A specific configuration for accomplishing these functions is shown in FIG. 1, leaving a detail thereof for later description.

The fuel cell optimum operating point tracking system has a fuel cell output voltage shift command circuit 11 capable of varying voltage output by the fuel cell 1 upon activation of the converter 2 to a maximum voltage for the maximum power point tracking control. The fuel cell output voltage shift command circuit 11 is configured so as to set a maximum command voltage and a minimum command voltage, vary an initial command voltage output upon activation up to the maximum command voltage, and then lower the voltage from the maximum command voltage down to the minimum command voltage.

The fuel cell optimum operating point tracking system has a fuel cell output power measuring circuit 12 capable of measuring a power state as a result of output voltage variation by the fuel cell output voltage shift command circuit 11.

The fuel cell optimum operating point tracking system has a fuel cell maximum power point judging and storing circuit 13 capable of judging a maximum power point of the output power of the fuel cell, by monitoring the power state as a result of output voltage variation by the fuel cell output voltage shift command circuit 11, and by monitoring also the output voltage measured by the fuel cell output power measuring circuit 12.

The fuel cell maximum power point judging and storing circuit 13 is configured so as to judge a voltage under which the command voltage becomes maximum within a range of the successive detection as the maximum power point, when the maximum power point is successively detected despite the output voltage is varied by the fuel cell output voltage shift command circuit 11.

The fuel cell optimum operating point tracking system has a timer circuit 14 capable of periodically activating the fuel cell output voltage shift command circuit 11 and the fuel cell output power measuring circuit 12. The timer circuit 14 has a specified voltage refreshing interval set therein, and is configured so as to measure the power state by clearing, after every elapse of the specified voltage refreshing interval, the stored values of the fuel cell output voltage maximum point and the output voltage of the fuel cell maximum power point judging and storing circuit 13, and by varying the output voltage of the fuel cell up to as high as the maximum voltage for the maximum power point tracking control through activation of the fuel cell output voltage shift command circuit 11 and the fuel cell output power measuring circuit 12.

The fuel cell optimum operating point tracking system has an optimum operating point shift command circuit 15 capable of tracking the optimum operating point, upon being instructed by the fuel cell output voltage shift command circuit 11 that variation in the output voltage has finished, by monitoring the power state with the aid of the fuel cell maximum power point judging and storing circuit 13 to thereby keep the power source operation constant at a stable condition, and by effecting the maximum power monitoring through additionally giving a minimal voltage change at around the current operating voltage value.

Figure 2:
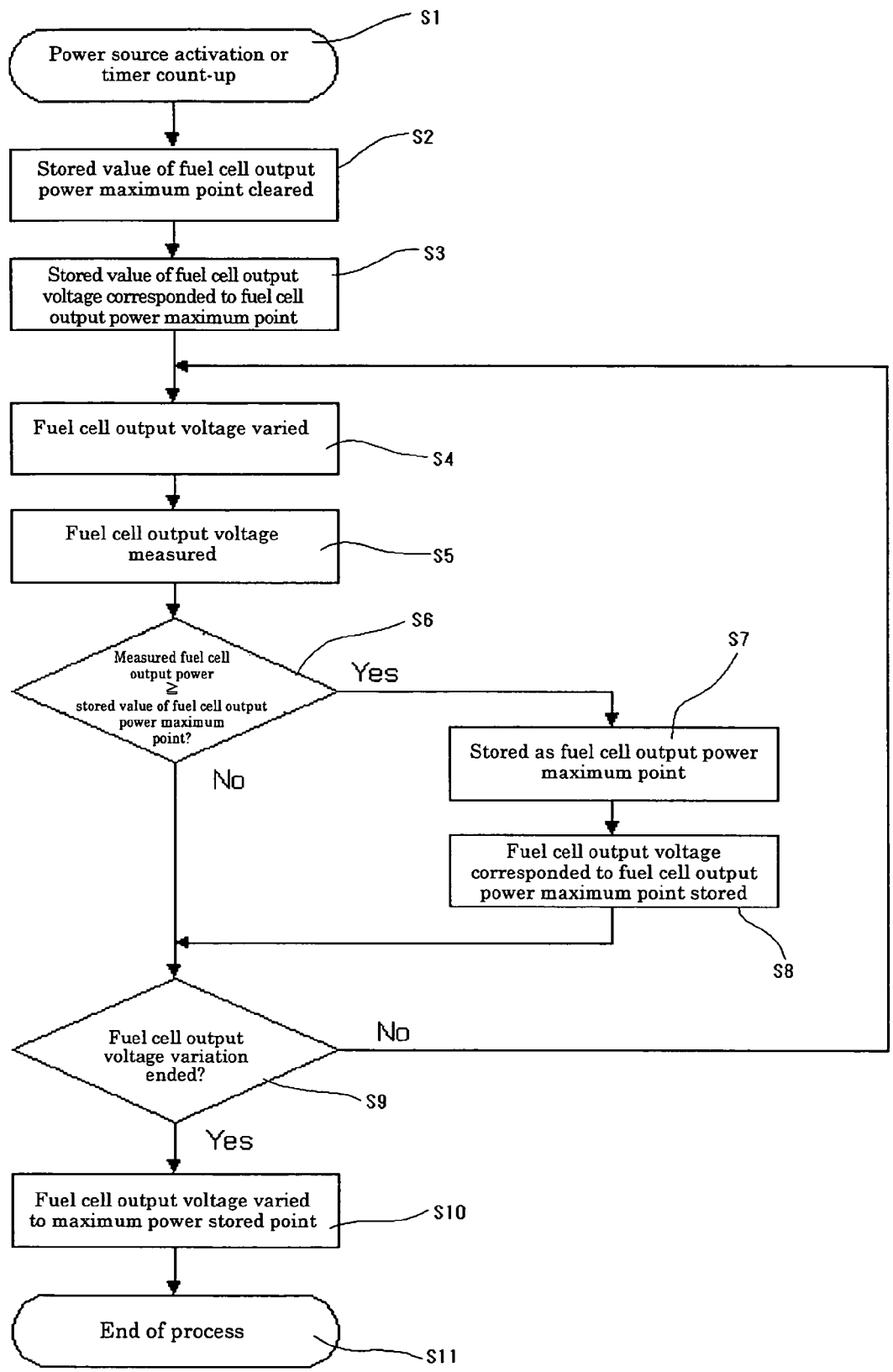
FIG. 2 is a flow chart showing processing of the fuel cell maximum power search function.
Figure 3:
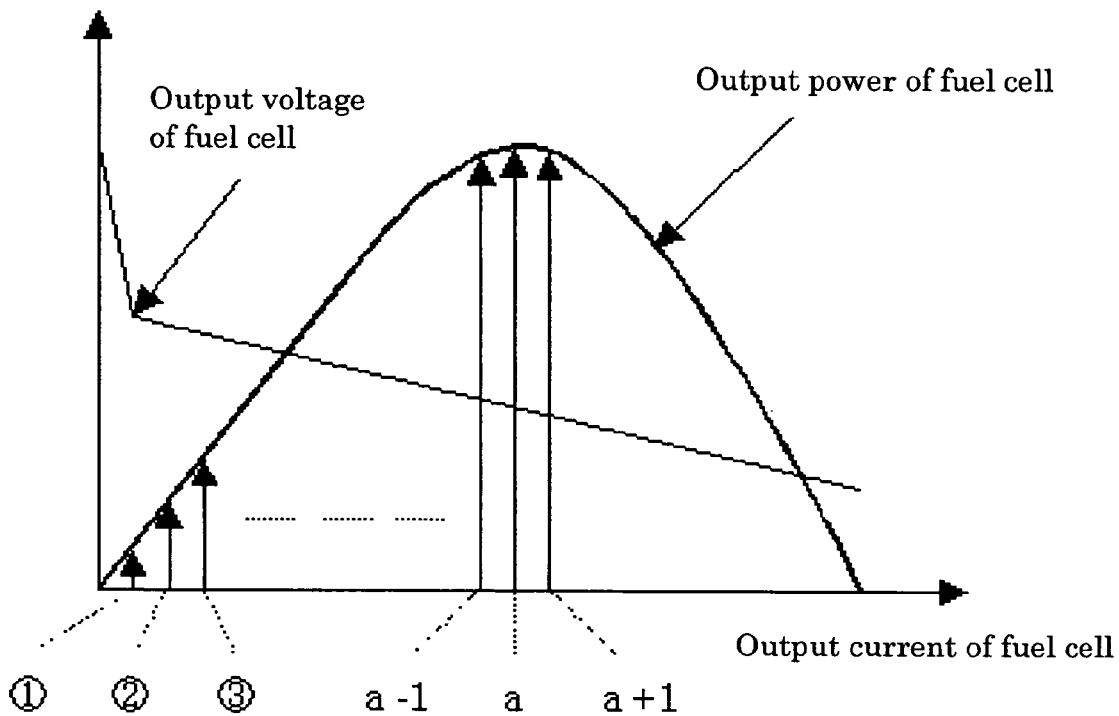
FIG. 3 is an operational waveform chart in the fuel cell maximum power search function.
Figure 4:
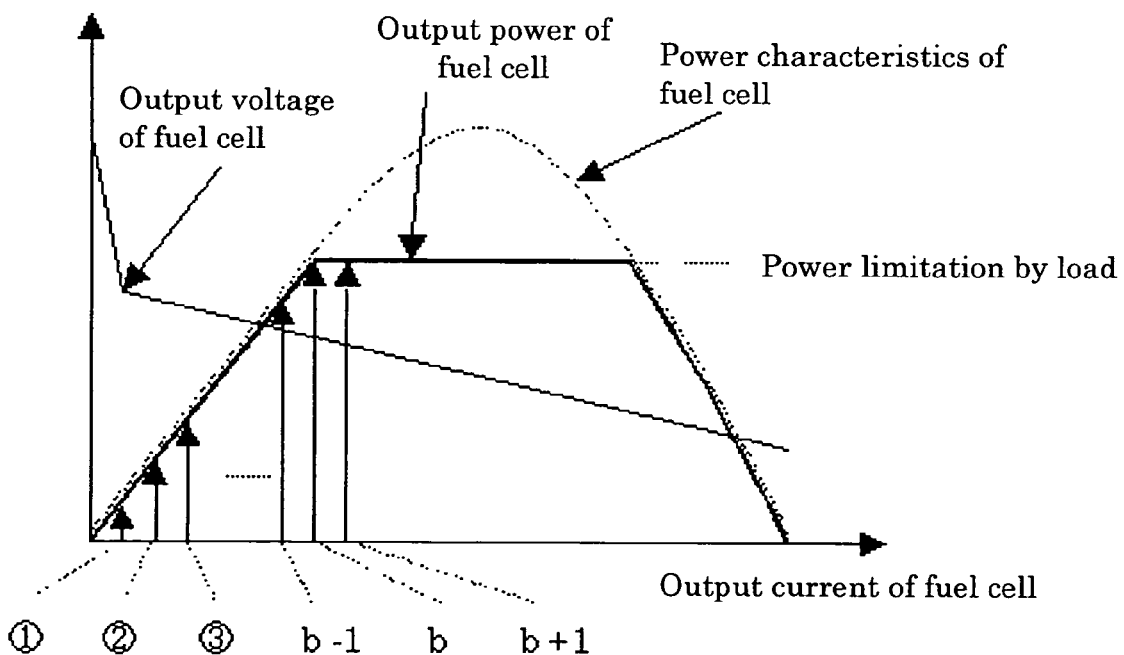
FIG. 4 is again an operational waveform chart in the fuel cell maximum power search function.

Operation and processing of the fuel cell maximum power search function of thus-configured fuel cell optimum operating point tracking system will be explained referring to the flow chart shown in FIG. 2. Operation waveform charts expressing the fuel cell maximum power search upon activation are shown in FIG. 3 and FIG. 4, and operation waveform charts expressing the fuel cell maximum power search during normal operation are shown in FIG. 5 to FIG. 10.

When the power source is activated (S1), the timer circuit 14 turns on, and clears a stored value of the fuel cell output voltage maximum point (S2). At the same time, a stored value of the fuel cell output voltage corresponded to the fuel cell output voltage maximum point is also cleared (S3).

Next, the timer circuit 14 turns on, and the fuel cell output voltage shift command circuit 11 starts to operate, so as to vary the fuel cell output voltage (S4). Thus-varied fuel cell output power is measured by the fuel cell output power measuring circuit 12 (S5). Whether thus-measured fuel cell output power is larger than a stored value of the fuel cell output voltage maximum point or not is judged by the maximum power point judging and storing circuit 13 (S6).

If the measured fuel cell output power was judged as being smaller than the stored value of the fuel cell output voltage maximum point, the fuel cell output power is stored as the fuel cell output voltage maximum point by the fuel cell maximum power point judging and storing circuit 13 (S7).

For the case where the maximum power point was successively detected even if the output voltage of the fuel cell was varied by the fuel cell output voltage shift command circuit 11 as shown in the waveform chart in FIG. 4A, a voltage under which the command voltage becomes maximum within a range of the successive detection is judged as the maximum power point. The fuel cell output voltage of the fuel cell output voltage maximum point is also stored by the fuel cell maximum power point judging and storing circuit 13 (S8), and whether the variation of the fuel cell output voltage has finished or not is judged (S9). If the variation of the fuel cell output voltage has finished, the fuel cell output voltage is shifted to the maximum power stored point (S10), and thereby the operation and processing of the fuel cell maximum power search come to the end (S11).

On the contrary, when the fuel cell output power measured at point "a+1" is judged as being smaller than the stored value of the fuel cell output voltage maximum point measured at point "a", as shown in the waveform chart in FIG. 3, whether the variation of the fuel cell output voltage has finished or not is judged (S9). If the variation of the fuel cell output voltage has finished, the fuel cell output voltage is shifted to the maximum power stored point (S10), and thereby the operation and processing of the fuel cell maximum power search come to the end (S11).

If the variation of the fuel cell output voltage has not ended, the fuel cell output voltage shift command circuit 11 reactivates, and makes another variation in the fuel cell output voltage (S4). Thus-varied fuel cell output power is measured by the fuel cell output power measuring circuit 12 (S5). On the contrary, if the variation of the fuel cell output voltage has finished, the fuel cell output voltage is shifted to the maximum power stored point (S10), and thereby the operation and processing of the fuel cell maximum power search come to the end (S11).

As has been described in the above and indicated by FIG. 3 and FIG. 4, the response characteristic was successfully improved by monitoring the power state under varied voltage of the cell upon activation, and by starting the operation at a voltage corresponded to the maximum power point.

Figure 5:
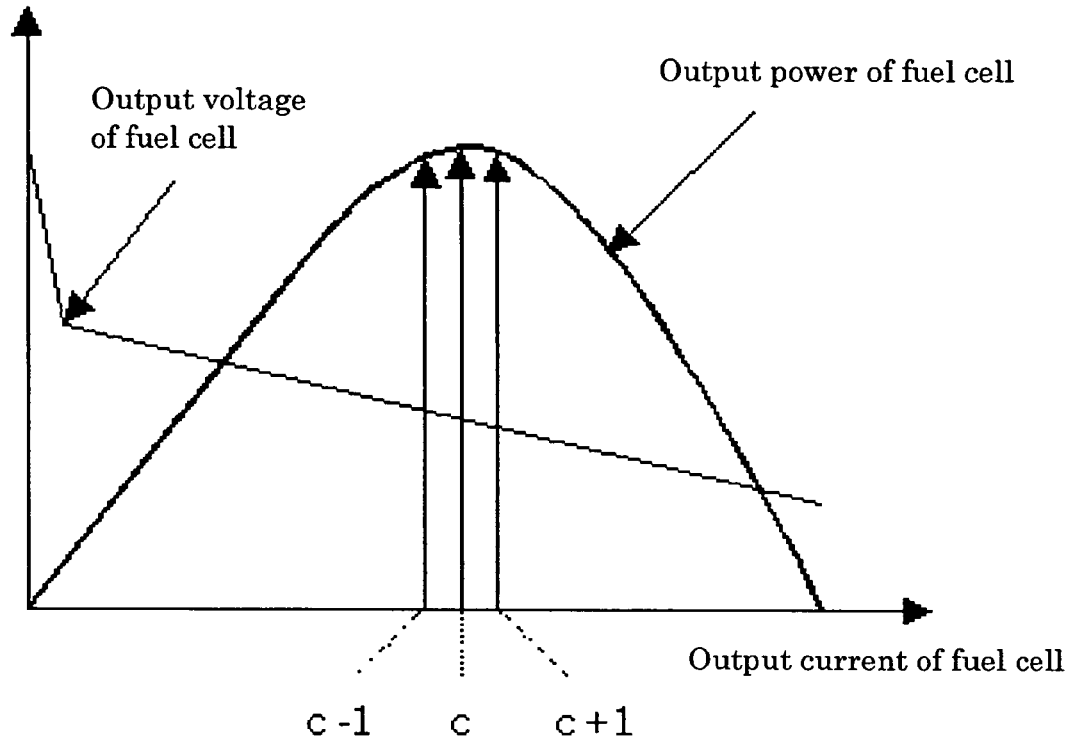
FIG. 5 is again an operational waveform chart in the fuel cell maximum power search function.
Figure 6:
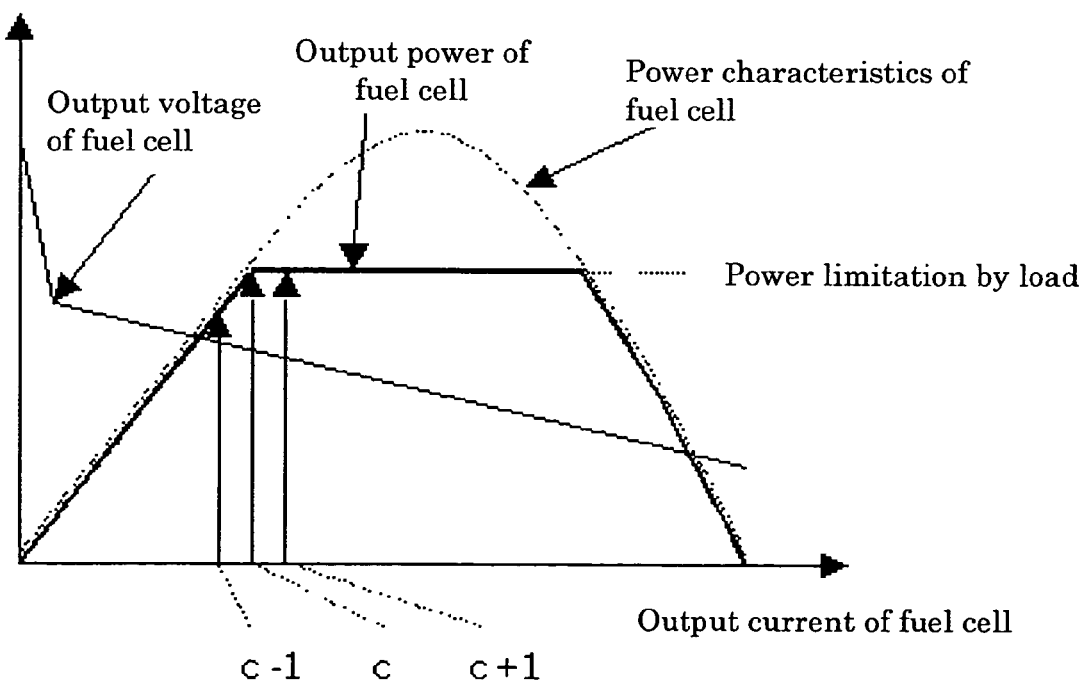
FIG. 6 is again an operational waveform chart in the fuel cell maximum power search function.

In this embodiment, the fuel cell maximum power search function is allowed to operate also in the normal operation, so as to monitor the power state, as being periodically activated by the timer circuit 14. As shown in FIG. 5, if there is no variation made in the maximum power point, and the fuel cell output power measured at point "c+1" is judged as being smaller than the stored value of fuel cell output voltage maximum point measured at point "c", this point "c", judged as being the stored value, is kept unchanged as the operation point. On the other hand, if the maximum power point was successively detected even if the output voltage was varied as shown in FIG. 6, a voltage under which the command voltage becomes maximum within a range of the successive detection is judged as the maximum power point.

Figure 7:
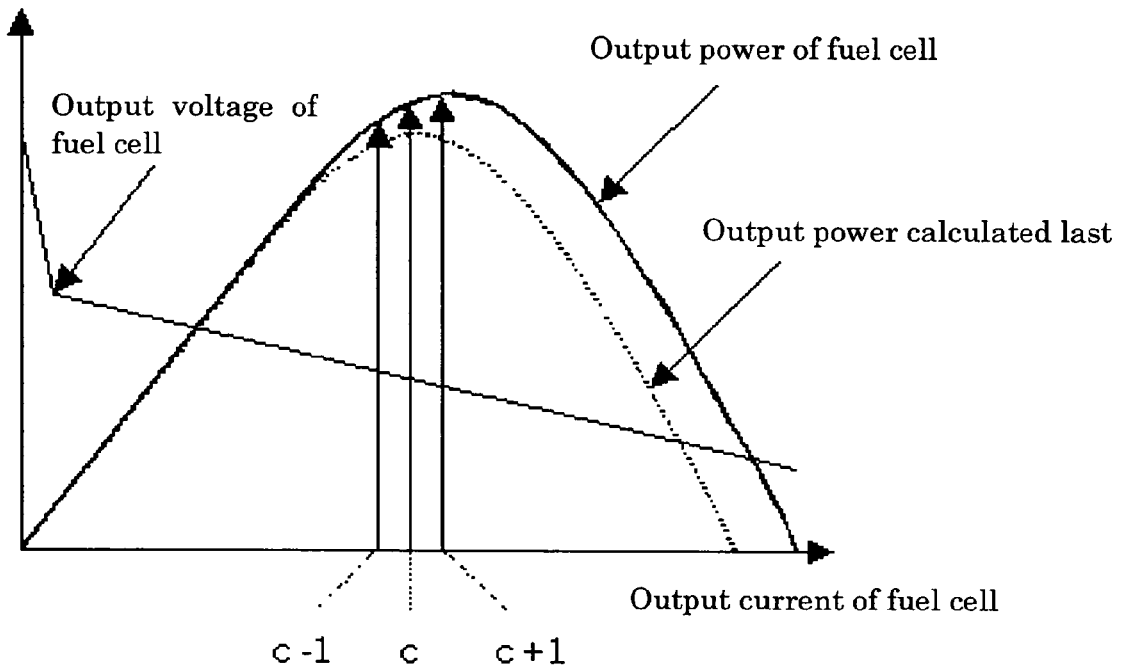
FIG. 7 is again an operational waveform chart in the fuel cell maximum power search function.
Figure 8:
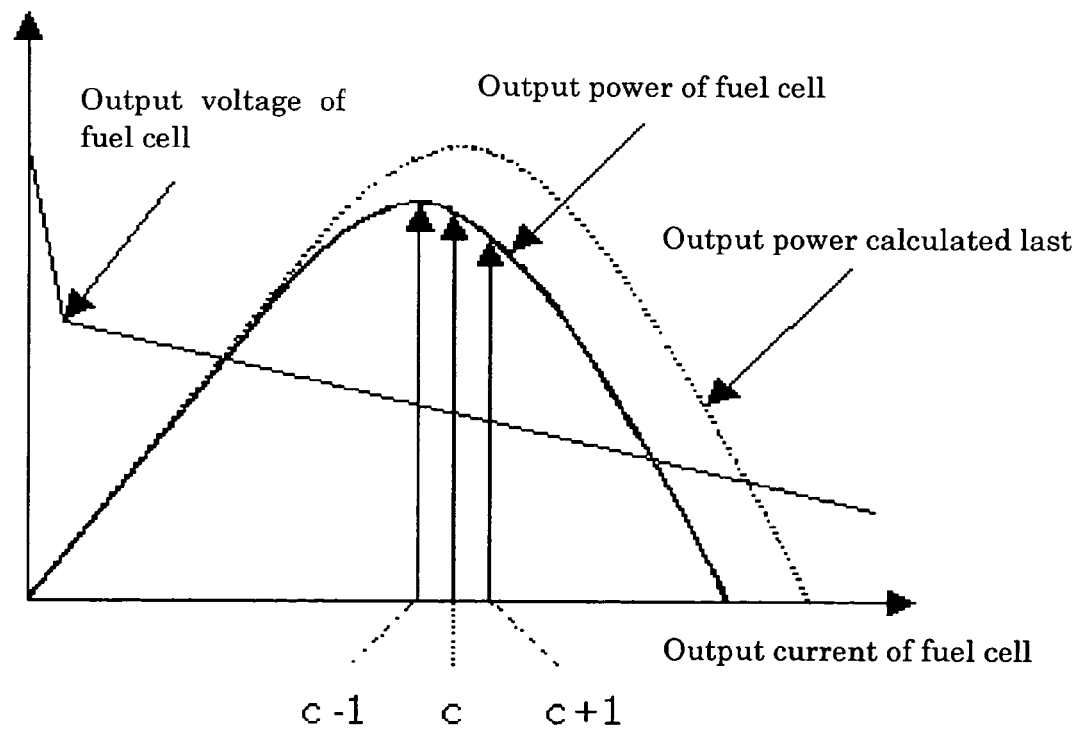
FIG. 8 is again an operational waveform chart in the fuel cell maximum power search function.

As shown in FIG. 7, when the load was found to be larger than the power generation capacity of the fuel cell, and the power generation capacity of the fuel cell was then increased, the fuel cell output power measured at point "c+1" becomes larger than the fuel cell output power measured at point "c", defining the point "c+1" as the operation point. On the contrary, if as shown in FIG. 8, the power generation capacity of the fuel cell was reduced, the fuel cell output power measured at point "c" is now larger than the fuel cell output power measured at point "c−1", so that the point "c−1" is defined as the operation point.

Figure 9:
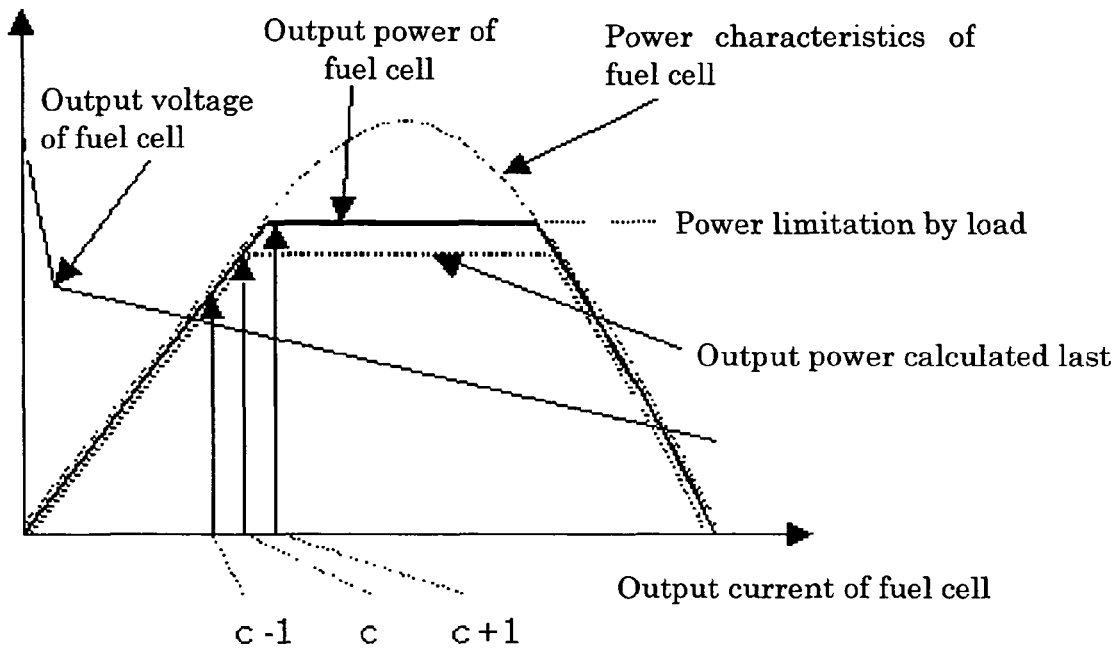
FIG. 9 is again an operational waveform chart in the fuel cell maximum power search function.
Figure 10:
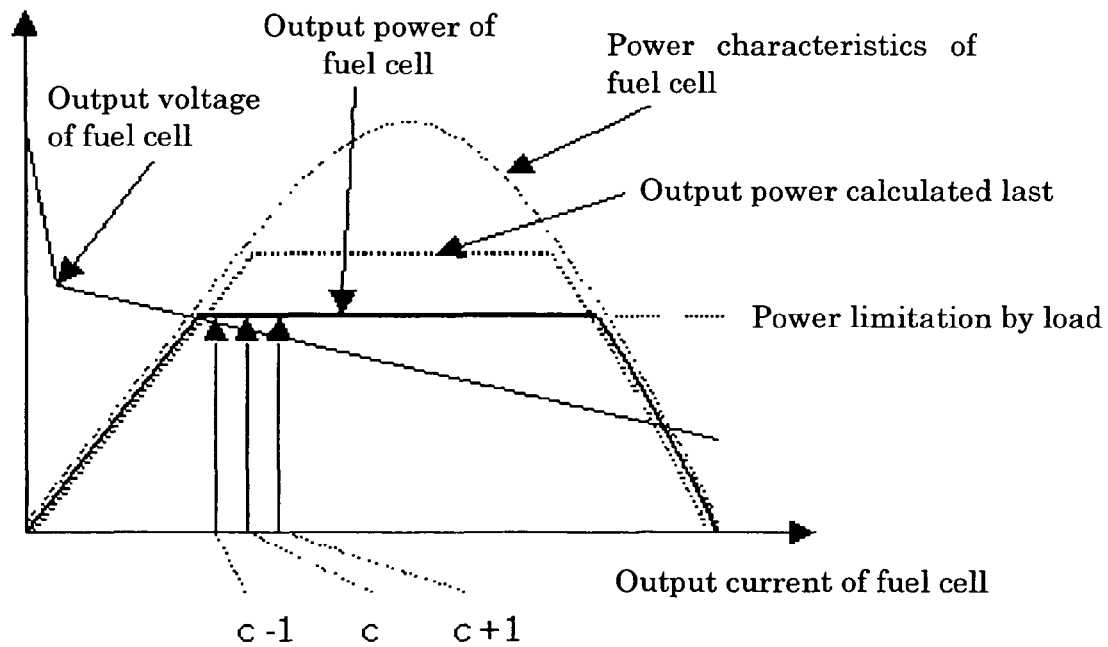
FIG. 10 is again an operational waveform chart in the fuel cell maximum power search function.

As shown in FIG. 9, when the load was found to be smaller than the power generation capacity of the fuel cell, and the load was increased, the fuel cell output power measured at point "c+1" becomes larger than the fuel cell output power measured at point "c", defining the point "c+1" as the operation point. On the contrary, if, as shown in FIG. 10, the load was reduced, the fuel cell output power measured at point "c" is now larger than the fuel cell output power measured at point "c–1", so that the point "c–1" is defined as the operation point.

As has been described in the above and indicated by FIG. 5 to FIG. 10, a stable operation can be ensured by monitoring of the power state with the aid of the periodical activation of the timer circuit 14. In the periodical operation with the aid of the timer circuit 14, the operation and processing shown in the flow chart in FIG. 2 can proceed, similarly to the case when the power source is activated.

In this embodiment, the setting is made so that, for the case when the maximum power point was successively detected even if the output voltage was varied by the fuel cell output voltage shift command circuit 11, a voltage under which the command voltage becomes maximum within a range of the successive detection is judged as the maximum power point. This would be the best, but it is also allowable to make the setting so as to judge the center voltage within a range of the successive detection as the maximum power point, provided that the range of the successive detection can be defined. The same will apply to the description below.

Figure 11:
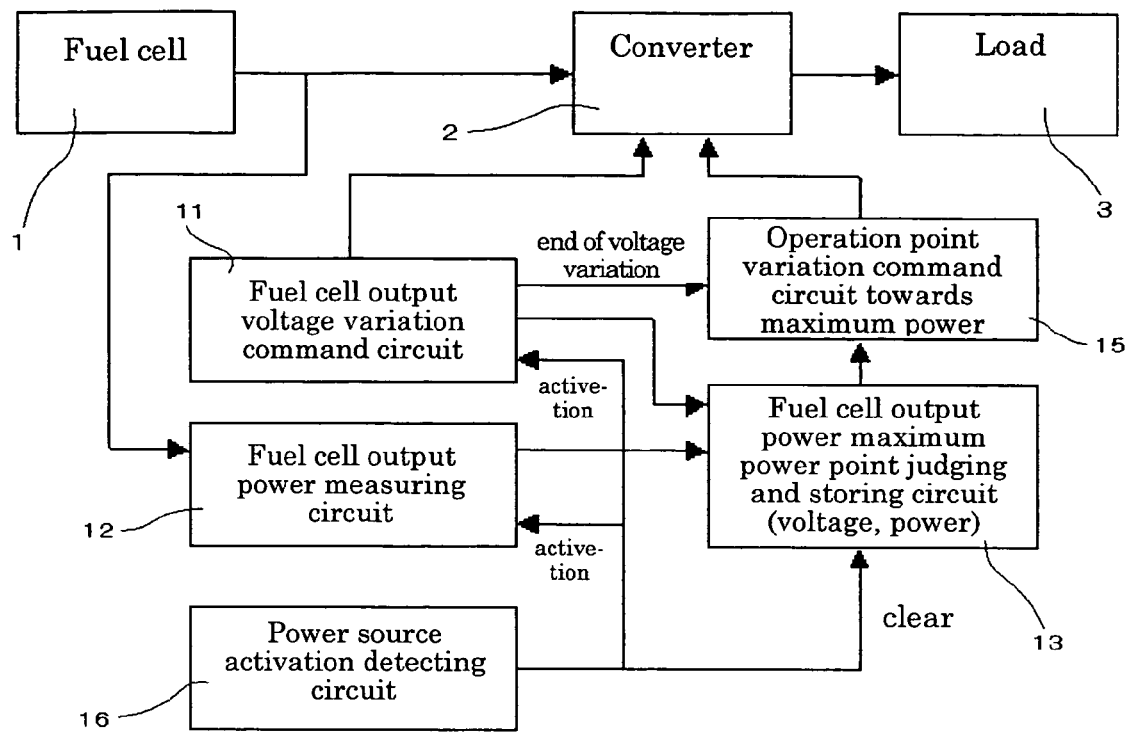
FIG. 11 is a block diagram showing an embodiment having a fuel cell maximum power search function different from that in the embodiment shown in FIG. 1.

Next paragraphs will describe an embodiment having a fuel cell maximum power search function different from that shown in FIG. 1. Specific configuration is shown in FIG. 11. The fuel cell optimum operating point tracking system comprises, similarly to the above-described embodiment, the fuel cell output voltage shift command circuit 11 capable of shifting a voltage output from the fuel cell 1 upon activation of the converter 2 up to the maximum voltage for the maximum power point tracking control; the fuel cell output power measuring circuit 12 capable of measuring a power state as a result of output voltage variation by the fuel cell output voltage shift command circuit 11; the fuel cell maximum power point judging and storing circuit 13 capable of judging a maximum power point of the output power of the fuel cell, by monitoring the power state as a result of output voltage variation by the fuel cell output voltage shift command circuit 11, and by monitoring also the output voltage measured by the fuel cell output power measuring circuit 12; and the optimum operating point shift command circuit 15 capable of tracking the optimum operating point, upon being instructed by the fuel cell output voltage shift command circuit 11 that variation in the output voltage has finished, by monitoring the power state with the aid of the fuel cell maximum power point judging and storing circuit 13 to thereby keep the power source operation constant at a stable condition, and by effecting the maximum power monitoring through additionally giving a minimal voltage change at around the current operating voltage value.

A principal feature of this embodiment resides in that a power source activation detecting circuit 16 is provided in place of the timer circuit 14. The power source activation detecting circuit 16 is configured so as to measure the power state by varying the output voltage of the fuel cell upon activation thereof up to as high as the maximum voltage for the maximum power point tracking control.

Figure 12:
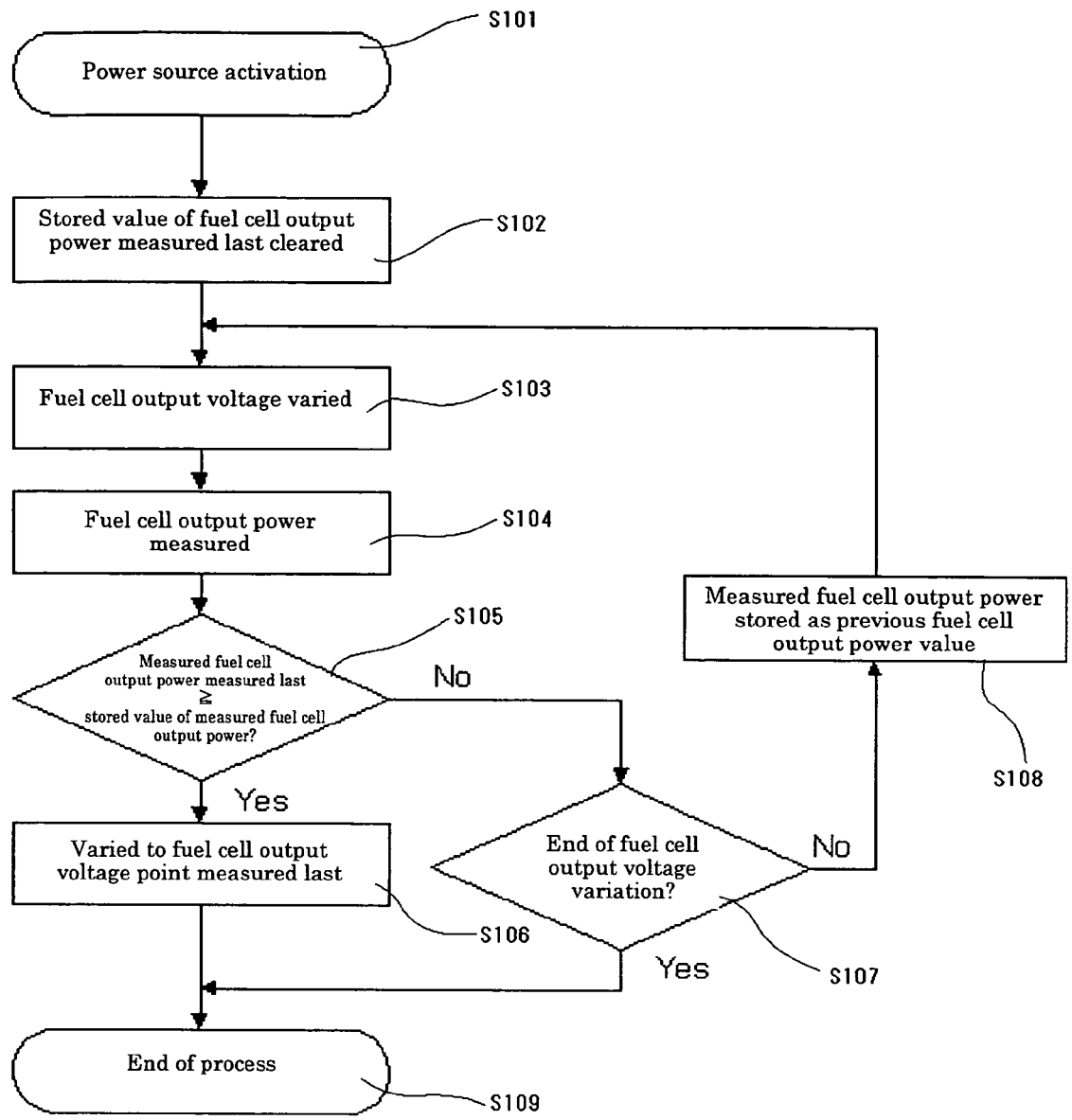
FIG. 12 is a flow chart of the embodiment shown in FIG. 11.

Operation and processing of the fuel cell maximum power search function of thus-configured fuel cell optimum operating point tracking system will be explained referring to the flow chart shown in FIG. 12.

When the power source is activated (S101), the power source activation detecting circuit 16 turns on, and clears a stored value of the fuel cell output power (S102). Next, the power source activation detecting circuit 16 turns on, and the fuel cell output voltage shift command circuit 11 starts to operate, so as to vary the fuel cell output voltage (S103). Thus-varied fuel cell output power is measured by the fuel cell output power measuring circuit 12 (S104). Whether thus-measured fuel cell output power is larger than the previously-measured fuel cell output power or not is judged by the maximum power point judging and storing circuit 13 (S105).

If the measured fuel cell output power was judged as being smaller than the previously-measured fuel cell output power, the previously-measured fuel cell output power voltage point is stored as the fuel cell output voltage maximum point by the fuel cell maximum power point judging and storing circuit 13 (S106).

As shown in the waveform chart in FIG. 4, if the maximum power point was successively detected even when the output voltage of the fuel cell was varied by the fuel cell output voltage shift command circuit 11, the previously-measured fuel cell output power voltage point, which is point "b" in FIG. 4, is assumed as the maximum power point, defined as the operation point for the succeeding operations, and thereby the operation and processing of the fuel cell maximum power search come to the end (S109).

On the contrary, when the fuel cell output power measured at point "a+1" is judged as being smaller than the stored value of the fuel cell output voltage maximum point measured at point "a", as shown in the waveform chart in FIG. 3, the point "a" is assumed as the maximum power point, defined as the operation point for the succeeding operations, and thereby the operation and processing of the fuel cell maximum power search come to the end (S109).

Whether the measured fuel cell output power is larger than the previously-measured fuel cell output power or not is judged by the maximum power point judging and storing circuit 13 (S105), and if thus-measured fuel cell output power was judged as being smaller than the previously-measured fuel cell output power, the next judgment is made on whether variation in the fuel cell output voltage has finished or not (S107). If it was judged that the variation in the fuel cell output voltage has not finished, the measured fuel cell output power is stored as the previously-measured fuel cell output power value (S108), and the fuel cell output voltage shift command circuit 11 activates again so as to vary the fuel cell output voltage (S103). Thus-varied fuel cell output power is measured by the fuel cell output power measuring circuit 12 (S104). On the contrary, if it was judged that the variation of the fuel cell output voltage has finished, the operation and processing of the fuel cell maximum power search come to the end (S109).

As has been described in the above and indicated by FIG. 3 and FIG. 4, the response characteristic was successfully improved by monitoring the power state under varied voltage of the cell upon activation, and by starting the operation at a voltage corresponded to the maximum power point.

In this embodiment, the fuel cell maximum power search function is allowed to operate also in the normal operation, so as to monitor the power state, as being periodically activated by the power source activation detecting circuit 16. As shown in FIG. 5, if there is no variation made in the maximum power point, and the fuel cell output power measured at point "c+1" is judged as being smaller than the stored value of fuel cell output voltage maximum point measured at point "c", this point "c", judged as being the stored value of fuel cell output voltage maximum point, is kept unchanged as the operation point. On the other hand, if the maximum power point was successively detected even if the output voltage was varied as shown in FIG. 6, the previously-measured fuel cell output power point, which is point "c" in FIG. 6, is assumed as the maximum power point, and defined as the operation point for the succeeding operations.

As shown in FIG. 7, when the load was found to be larger than the power generation capacity of the fuel cell, and the power generation capacity of the fuel cell was then increased, the fuel cell output power measured at point "c+1" becomes larger than the fuel cell output power measured at point "c", defining the point "c+1" as the operation point. On the contrary, if as shown in FIG. 8, the power generation capacity of the fuel cell was reduced, the fuel cell output power measured at point "c" is larger than the fuel cell output power measured at point "c−1", so that the point "c−1" is defined as the operation point.

As shown in FIG. 9, when the load was found to be smaller than the power generation capacity of the fuel cell, and the load was increased, the fuel cell output power measured at point "c+1" becomes larger than the fuel cell output power measured at point "c", defining the point "c+1" as the operation point. On the contrary, if, as shown in FIG. 10, the load was reduced, the fuel cell output power measured at point "c" is larger than the fuel cell output power measured at point "c−1", so that the point "c−1" is defined as the operation point.

As is obvious from the above, by equipping the fuel cell maximum power search function with the power source activation detecting circuit 16 capable of measuring the power state while varying the output voltage of the fuel cell upon activation thereof up to as high as the maximum voltage for the maximum power point tracking control, it is no more necessary to clear stored values of the maximum point of the fuel cell output power and the output voltage corresponded thereto upon activation of the fuel cell for every specified voltage refreshing interval, and to measure the power state while varying the output voltage of the fuel cell up to as high as the maximum voltage for the maximum power point tracking control, and it is made possible to measure the operation point to be defined as the maximum power point even under a power restriction by a load.

Although the power source activation detecting circuit 16 was provided in this embodiment, it is also allowable to provide the timer circuit 14. For the case where the timer circuit 14 is provided, it is preferable to, similarly to as the foregoing embodiment, periodically activate the fuel cell output voltage shift command circuit 11 and the fuel cell output power measuring circuit 12, and to vary the output voltage of the fuel cell up to as high as the maximum voltage for the maximum power point tracking control, to thereby measure the power state. In the periodical operation with the aid of the timer circuit 14, the operation and processing shown in the flow chart in FIG. 12 can proceed, similarly to the case when the power source is activated.

Figure 13:
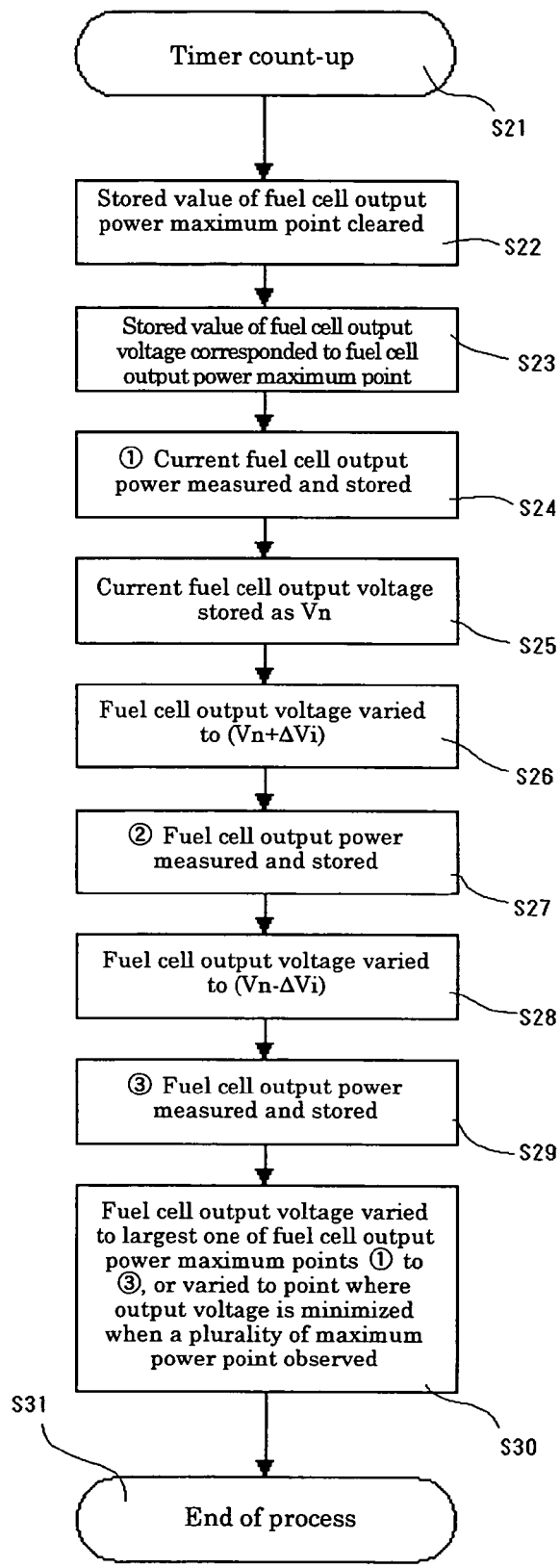
FIG. 13 is a flow chart showing processing of a fuel cell optimum operating point tracking function.
Figure 14:
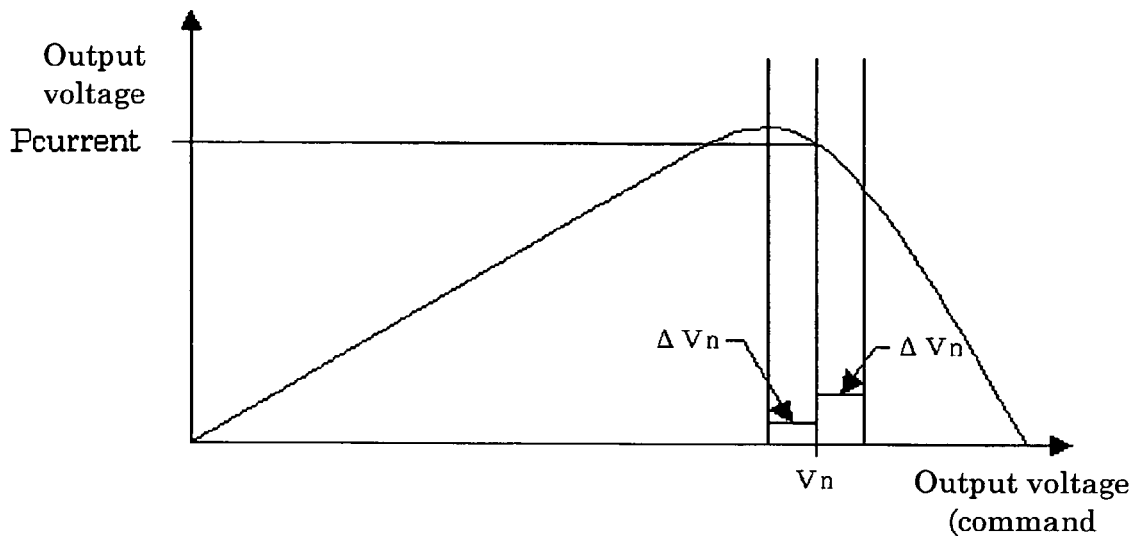
FIG. 14 is an operational waveform chart in the fuel cell optimum operating point tracking function.

Next paragraphs will describe operation and processing of the fuel cell optimum operating point tracking function capable of tracking the optimum operating point by effecting the maximum power monitoring through additionally giving a minimal voltage change at around the current operating voltage value, referring to the flow chart shown in FIG. 13. Operation waveform of the operation and processing of the optimum operating point are shown in FIG. 14.

Upon completion of the operation and processing of the fuel cell maximum power search, timer count-up starts (S21), the timer circuit 14 turns on, and clears a stored value of the fuel cell output voltage maximum point (S22). At the same time, a stored value of the fuel cell output voltage corresponded to the fuel cell output voltage maximum point is also cleared (S23).

Next, the timer circuit 14 activates the fuel cell output voltage shift command circuit 11 and the fuel cell output power measuring circuit 12, allows the fuel cell output power measuring circuit 12 to measure the current fuel cell output power, and allows the maximum power point judging and storing circuit 13 to store the current fuel cell output power (S24). Next as shown in FIG. 14, the maximum power point judging and storing circuit 13 stores the fuel cell output voltage as Vn (S25), and allows the fuel cell output voltage shift command circuit 11 to shift the fuel cell output voltage to (Vn+ΔVn) (S26).

Next, the shifted fuel cell output power is measured by the fuel cell output power measuring circuit 12, and the fuel cell output power is stored by the maximum power point judging and storing circuit 13 (S27). Next, as shown in FIG. 14, the fuel cell output voltage is shifted to (Vn−ΔVn) by the fuel cell output voltage shift command circuit 11 (S28), the shifted fuel cell output power is measured by the fuel cell output power measuring circuit 12, and the fuel cell output power is stored by the maximum power point judging and storing circuit 13 (S29).

The fuel cell output voltage is then shifted to the fuel cell output voltage maximum point in the fuel cell output power measured in steps S24, S27 and S29, or shifted to a point where the command output voltage is maximized when a plurality of maximum power points were observed (S30), and thereby the processing comes to the end (S31). Repetition of this procedure makes it possible to monitor the maximum power and to track the optimum operation point, while keeping the power source operation constant at a stable condition.

Figure 15:
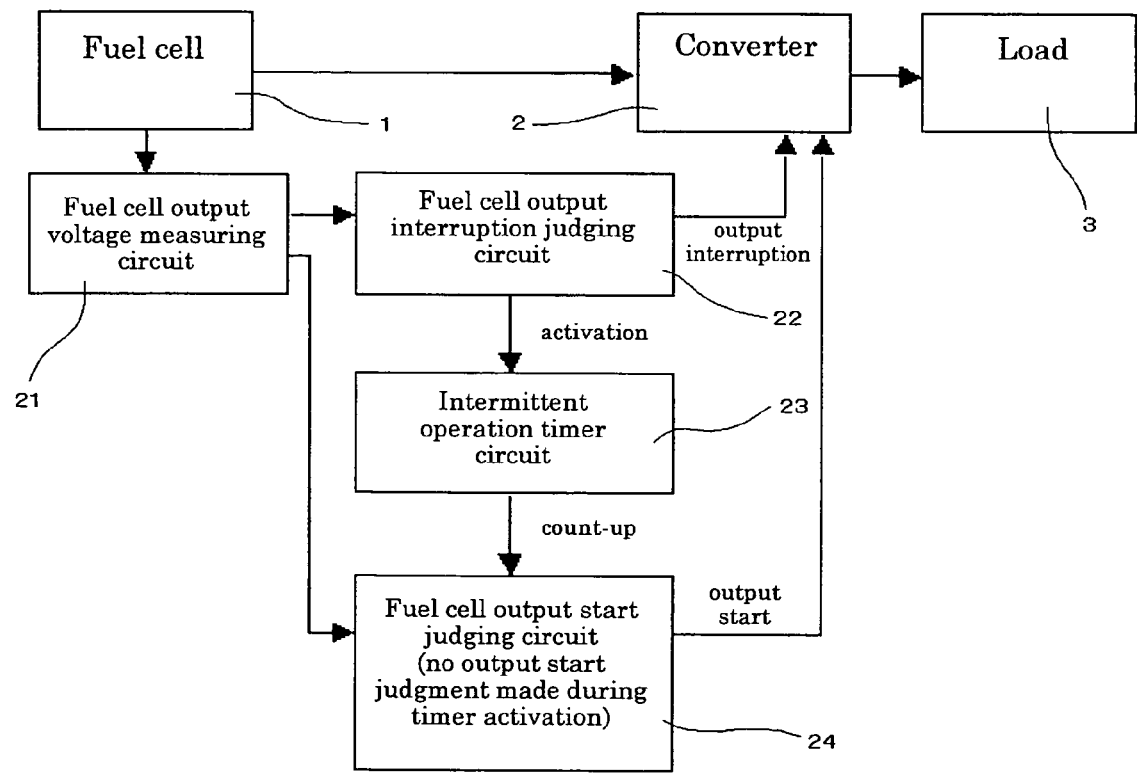
FIG. 15 is a block diagram showing a best mode for carrying out an intermittent oscillation preventive operation according to the present invention.

The succeeding interruption of the power supply by the fuel cell raises the fuel cell voltage, and this may falsely be judged as operation enable, and may result in an intermittent operation. The fuel cell optimum operating point tracking system of the present invention is therefore provided with the intermittent operation preventive function capable of monitoring the fuel cell output voltage during operation of the power source device, and of turning the fuel cell into an interruption state by outputting an interruption output signal when the fuel cell output voltage falls to or below the fuel cell output interruption voltage. A block diagram of the power source device equipped with the intermittent operation preventive function is shown in FIG. 15.

The intermittent operation preventive function has a fuel cell output voltage measuring circuit 21 allowing the converter 2 to measure the fuel cell output voltage during operation of the fuel cell. The intermittent operation preventive function also has a fuel cell output interruption judging circuit 22 capable of judging whether the output of the fuel cell 1 should be interrupted or not, when the fuel cell output voltage measured by the fuel cell output voltage measuring circuit 21 falls to or below the fuel cell output interruption voltage. The fuel cell output interruption judging circuit 22 is configured so as to generate an output interruption signal to the converter 2, when interruption of the fuel cell 1 was judged.

The intermittent operation preventive function has a timer circuit 23 capable of controlling intervals of the intermittent oscillation of the fuel cell 1. The timer circuit 23 is configured so as to turn the converter 2 into an interruption state, to set a restart wait time, and to measure the output voltage of the fuel cell 1 after the elapse of the restart wait time.

There is also provided a fuel cell output start judging circuit 24 to which data of the output voltage of the fuel cell 1 measured by the fuel cell output voltage measuring circuit 21 is entered after the elapse of the restart wait time set by the timer circuit 23. The fuel cell output start judging circuit 24 is configured so as to judge whether the output voltage of the fuel cell 1 after the elapse of the restart wait time is large enough to restart the fuel cell 1 or not, and to output an operation output signal to thereby bring the converter 2 into operation state, when the output voltage was judged as having reached or exceeded the restart voltage of the fuel cell 1.

Figure 16:
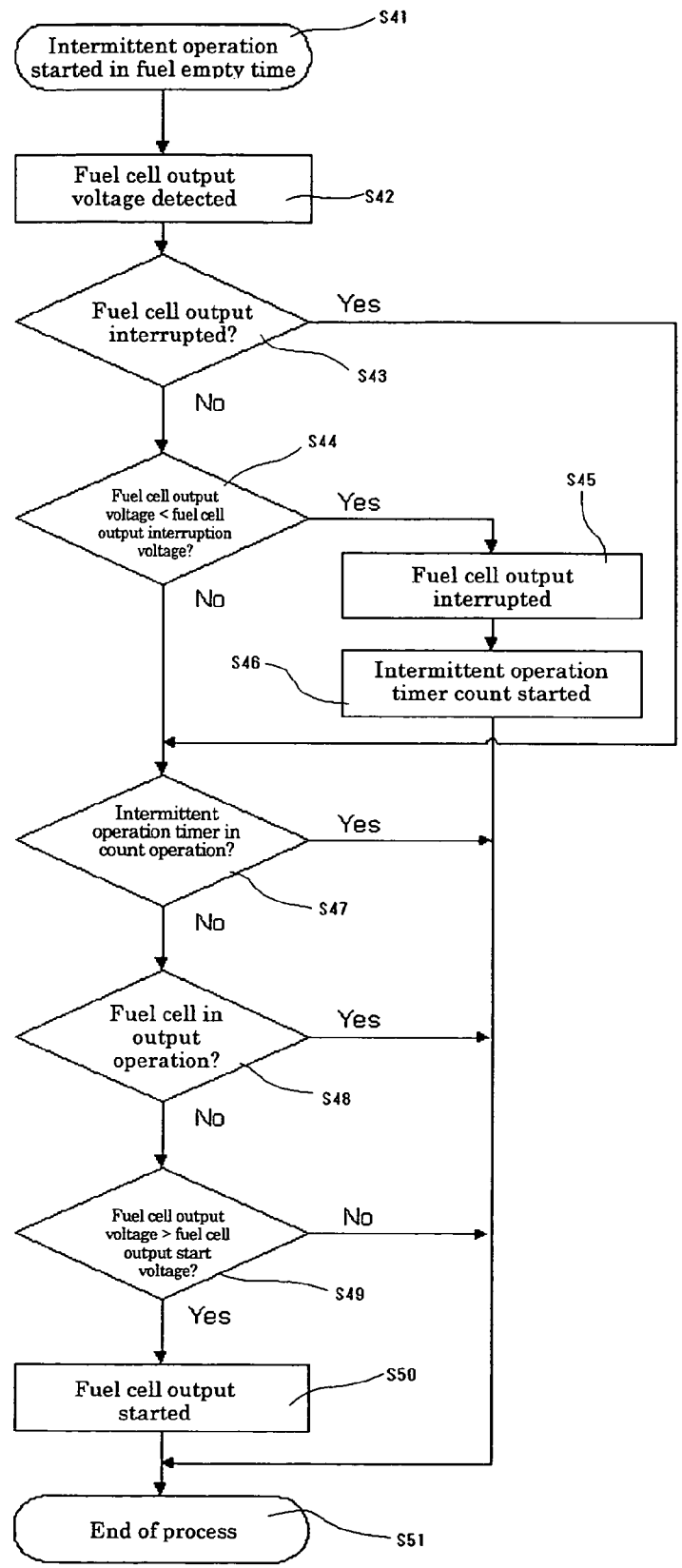
FIG. 16 is a flow chart showing processing of the embodiment shown in FIG. 15.

Operation and processing for preventing the intermittent operation of thus-configured fuel cell optimum operating point tracking system will be explained referring to the flow chart shown in FIG. 16. When the fuel cell stops the power supply, raises the voltage and is judged as being operable, the intermittent operation begins (S41). This allows the fuel cell output voltage measuring circuit 21 to measure the output voltage of the fuel cell 1 (S42). Whether the output of the fuel cell 1 is interrupted or not is judged by the fuel cell output interruption judging circuit 22 (S43).

Next, when the output of the fuel cell 1 was judged as being not interrupted, whether the fuel cell output voltage measured by the fuel cell output voltage measuring circuit 21 is equal to or lower than the fuel cell output interruption voltage or not is judged by the fuel cell output interruption judging circuit 22 (S44). When the fuel cell output voltage is judged as being equal to or smaller than the fuel cell output interruption voltage, a fuel cell output interruption signal is sent to the converter 2 (S45), also to the timer circuit 23, to thereby start timer count for the intermittent operation (S46), and the process comes to the end (S51).

Figure 17:
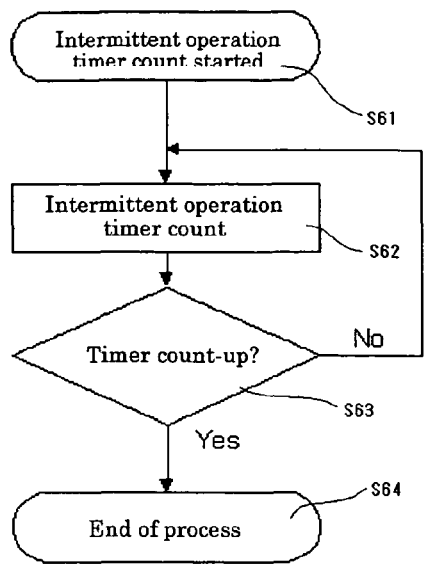
FIG. 17 is again a flow chart showing processing of the embodiment shown in FIG. 15.

FIG. 17 is a flow chart showing operation and processing proceeded after the intermittent operation timer count is started. Upon start of the intermittent operation timer count (S61), the intermittent operation timer count is conducted by the timer circuit 23 (S62). Whether the timer count-up has reached or not is judged by the timer circuit 23 (S63), and confirmation of the timer count-up leads the process of intermittent timer count to the end (S64). By this procedure, it is made possible to turn the converter 2 into the interruption state by sending an interruption output signal, when the fuel cell output voltage falls to or below the fuel cell output interruption voltage during operation of the converter 2.

On the other hand, when the fuel cell output voltage was judged as being equal to or exceeding the fuel cell output interruption voltage, whether the intermittent operation timer count is in process or not is judged (S47), and if the intermittent operation timer count was judged as being not in process, a judgment is then made on whether the fuel cell 1 is in output operation (S48). If the fuel cell 1 was judged as being not in output operation, a judgment is made again on whether the fuel cell output voltage is equal to or exceeds the fuel cell output interruption voltage or not (S49), and if the fuel cell output voltage is equal to or exceeds the fuel cell output interruption voltage, the output operation of the fuel cell 1 is started (S50), and thereby the operation and processing for preventing the intermittent operation come to the end (S51).

Figure 18:
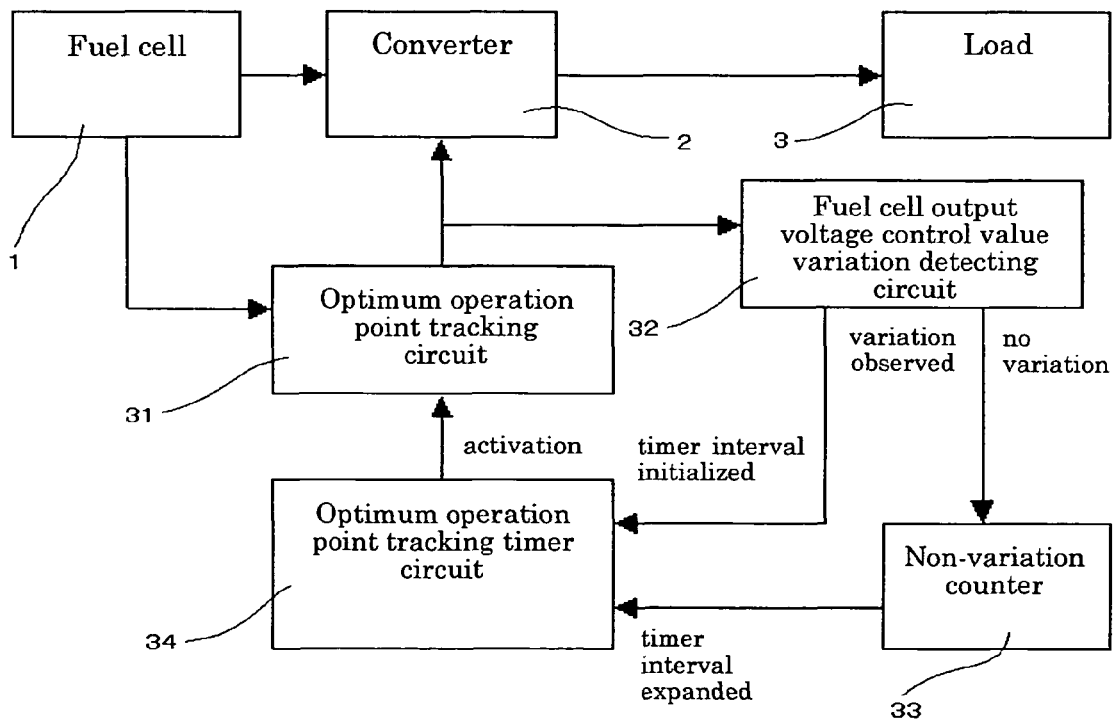
FIG. 18 is a block diagram showing a best mode for carrying out an optimum operating point tracking and retaining operation according to the present invention.

The fuel cell optimum operating point tracking system of the present invention further comprises an optimum operating point tracking and retaining function capable of widening the specified voltage refreshing interval, when variation in the output voltage of the fuel cell 1 falls below the amount of variation of set voltage within a predetermined time period. The optimum operating point tracking and retaining function is set so that it can recover the original specified voltage refreshing interval, when variation in the output voltage was found to exceed the amount of variation of set voltage after the widening of the specified voltage refreshing interval. FIG. 18 is a block diagram of a power source device provided with the optimum operating point tracking and retaining function.

The optimum operating point tracking and retaining function is configured as having optimum operating point tracking circuit 31 tracking the optimum operating point. The optimum operating point tracking circuit 31 further comprises a fuel cell maximum power search function and a fuel cell optimum operating point tracking function, and most preferably has a circuit configuration almost same as that of the fuel cell optimum operating point tracking system shown in FIG. 1.

The optimum operating point tracking circuit 31 tracks the optimum operating point, and sends an optimum operating point tracking information to the converter 2. The optimum operating point tracking and retaining function has a fuel cell output voltage control value variation detecting circuit 32. The fuel cell output voltage control value variation detecting circuit 32 is configured to receive the optimum operating point tracking information from the optimum operating point tracking circuit 31, to detect variation in the control value, and to judge whether the variation in the output voltage of the fuel cell fell below or exceeded the amount of variation of set voltage within a predetermined time period.

The optimum operating point retaining unit has a counter 33, and is configured to activate counting by the counter 33, when the variation in the output voltage is judged, by the fuel cell output voltage control value variation detecting circuit 32, as having fallen below the amount of variation of set voltage.

The optimum operating point retaining unit has a timer circuit 34. If the variation in the output voltage detected by the fuel cell output voltage control value variation detecting circuit 32 fell below the amount of variation of set voltage for a predetermined period, and a predetermined number of times of this event was successively counted by the counter, it is judged that the output voltage fell below the amount of variation of set voltage within the predetermined time period, and the specified voltage refreshing interval is widened. On the contrary, if the amount of variation of set voltage detected by the fuel cell output voltage control value variation detecting circuit 32 exceeded the amount of variation of set voltage, the specified voltage refreshing interval is initialized.

Figure 19:
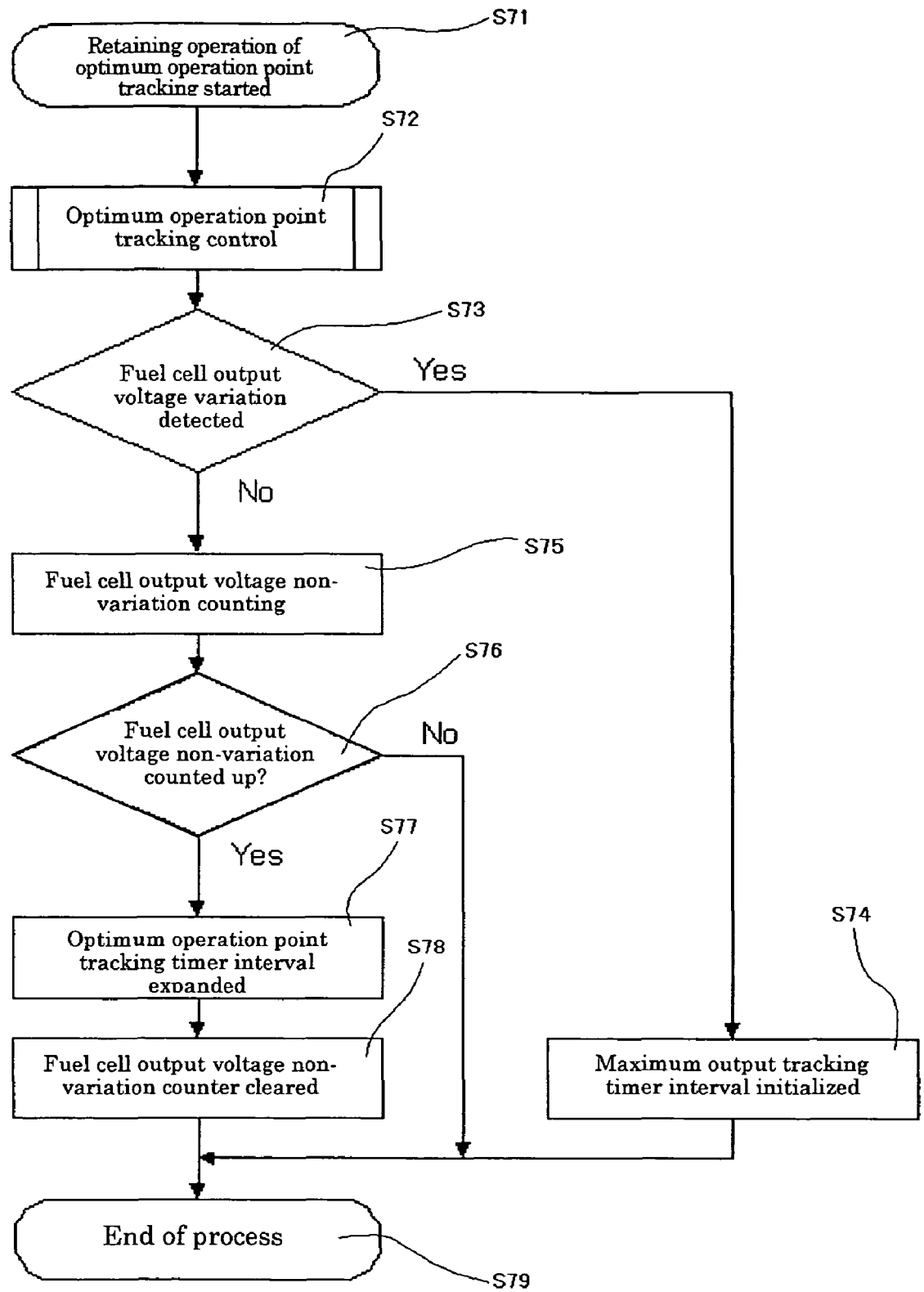
FIG. 19 is a flow chart showing processing of the embodiment shown in FIG. 18.
Figure 20:
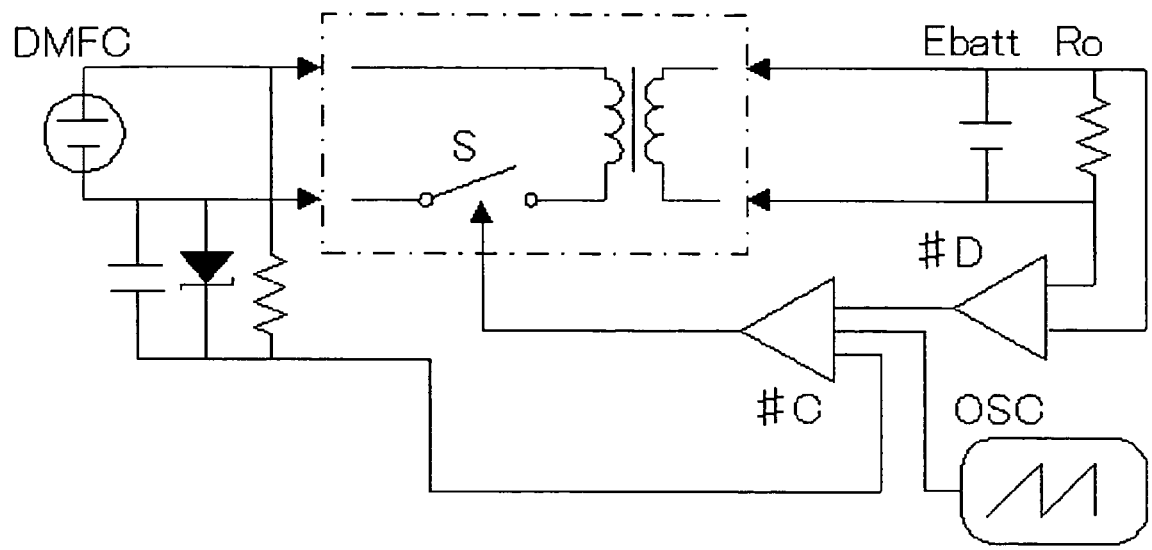
FIG. 20 is a circuit diagram of a conventional power source device equipped with an operating point tracking circuit.

Next paragraphs will describe operation and processing of the fuel cell optimum operating point retention in thus-configured fuel cell optimum operating point tracking system, referring to the flow chart shown in FIG. 19. Upon start of the retention operation of the fuel cell optimum operating point tracking (S71), the optimum operating point is tracked by the optimum operating point tracking circuit 31 (S72).

An optimum operating point information tracked by the optimum operating point tracking circuit 31 is sent to the converter 2, and also to the fuel cell output voltage control value variation detecting circuit 32. The fuel cell output voltage control value variation detecting circuit 32, which received the optimum operating point information, then detects variation in the control value, and judges whether the variation in the control value for the fuel cell output voltage exceeds or falls below the amount of variation of the set voltage over a predetermined time period (S73).

If the variation in the control value for the fuel cell output voltage falls below the amount of variation of set voltage over a predetermined time period, the fuel cell output voltage control value variation detecting circuit 32 makes a judgment of no variation, and the information is sent to the counter 33, with which the number of times of no variation in the fuel cell output voltage is counted (S75).

Next, whether the number of counts of no variation equals to or exceeds the predetermined number of times or not is judged (S76). If the predetermined number is not met, operation and processing of fuel cell optimum operating point retention once comes to the end (S79), and the operation and processing of fuel cell optimum operating point retention is restarted (S71).

On the other hand, if the number of counts of no variation counted by the counter equals to or exceeds the predetermined number of times, this information is set to the timer circuit 34, and the specified voltage refreshing interval is widened (S77). The timer circuit 34 clears the number of times of no variation in the fuel cell output voltage (S78). By this procedure, the operation and processing of the fuel cell optimum operating point retention once comes to the end (S79), and the operation and processing of fuel cell optimum operating point retention are restarted (S71). Widening of the specified voltage refreshing interval as described in the above makes it possible to reduce the number of times of the maximum operation point tracking, and to stabilize the operation conditions.

On the contrary, when a judgment is made on whether the variation in the control value for the fuel cell output voltage exceeds or falls below the amount of variation of set voltage over a predetermined time period (S73), and if the variation in the control value for the fuel cell output voltage exceeds the amount of variation of set voltage over the predetermined time period, the fuel cell output voltage control value variation detecting circuit 32 makes a judgment of "variation observed".

The information is sent to the timer circuit 34, and the operation and processing of the fuel cell optimum operating point retention are initialized by the timer circuit 34 (S74). More specifically, the original state is recovered if the operation and processing of the fuel cell optimum operating point retention has widened the specified voltage refreshing interval. By this procedure, the operation and processing of the fuel cell optimum operating point retention once come to the end (S79), and the operation and processing of fuel cell optimum operating point retention are restarted (S71).

It is preferable that each of the timer circuits 14, 23 and 34 in the above-described embodiments is configured so as to generate a reference clock, and so as to be synchronized with the reference clock.

Although each of the power source devices described in the foregoing embodiments was exemplified by a DC-DC converter, the present invention can be applicable also to any other power source devices, such as those using a DC-AC inverter, for example.

Although each of the fuel cell optimum operating point tracking system in the foregoing embodiments was described on the assumption of microcomputer, such system can be configured as being incorporated into other unit, or circuit, for example.

INDUSTRIAL APPLICABILITY

According to the present invention, it is made possible to track variable operation voltage of a fuel cell capable of supplying a maximum output power, taking temperature changes and chemical reactions into consideration, by monitoring the power state while varying the output voltage of the fuel cell upon activation thereof, and by allowing the fuel cell to start operation at a voltage corresponded to the maximum power point.

It is also made possible to realize a stable power supply from the fuel cell, by monitoring the power state while periodically varying the output voltage of the fuel cell, and by allowing the fuel cell to start operation at a voltage corresponded to the maximum power point thereof.

By equipping the fuel cell maximum power search function with a power source activation detecting unit capable of measuring the power state while varying the output voltage of the fuel cell upon activation thereof up to as high as the maximum voltage for the maximum power point tracking control, it is no more necessary to clear a stored value of the maximum point of the fuel cell output power and the output voltage corresponded thereto upon activation of the fuel cell for every specified voltage refreshing interval, and to measure the power state while varying the output voltage of the fuel cell up to as high as the maximum voltage for the maximum power point tracking control, and it is made possible to measure the operation point to be defined as the maximum power point even under a power restriction by a load.

By providing the intermittent operation preventive function capable of monitoring the fuel cell output voltage during operation of the power source device, and of turning the fuel cell into an interruption state by outputting an interruption output signal when the voltage falls to or below the fuel cell output interruption voltage, it is made possible to control the duration of time of the intermittent oscillation, and to realize a stable power supply from the fuel cell.

Because the setting is made so as to widen the specified voltage refreshing interval when the output voltage variation of the fuel cell falls below the amount of variation of set voltage within a predetermined time period, it is also made possible to stabilize the operation state even if the number of times of the maximum operation point tracking is reduced.

It is apparent that the present invention is not limited to the above embodiments, that may be modified and changed without departing from the scope and spirit of the invention.

What is claimed is:

1. A fuel cell optimum operating point tracking system used in a power source device powered by a fuel cell, configured so as to improve a responsiveness thereof by monitoring a power state, comprising:
   a fuel cell output power measuring unit capable of measuring the power state of the fuel cell; and
   a fuel cell optimum operating point tracking unit capable of tracking an optimum operating point, so that a power source operation is kept constant at a stable condition, wherein the fuel cell optimum operating point tracking unit finds the optimum operating point by changing the power state of the fuel cell by a minimal value from around a current operating state.

2. The fuel cell optimum operating point tracking system as claimed in claim 1, wherein the power state is an output voltage of said fuel cell, and the optimum operating point is a maximum power point of the fuel cell, and said fuel cell optimum operating point tracking unit comprises a fuel cell output voltage variation command unit capable of varying the output voltage of said fuel cell upon activation thereof up to as high as maximum voltage for maximum power point tracking control.

3. The fuel cell optimum operating point tracking system as claimed in claim 1, wherein the power state is an output voltage of said fuel cell, and the fuel cell output power measuring unit measures the output voltage of said fuel cell as the power state while varying the output voltage upon activation thereof.

4. The fuel cell optimum operating point tracking system as claimed in claim 1, wherein said fuel cell optimum operating point tracking unit comprises a fuel cell maximum power point judging-and-storing unit capable of monitoring an output power of said fuel cell upon activation thereof, and of judging the maximum power point of the output voltage of said fuel cell.

5. The fuel cell optimum operating point tracking system as claimed in claim 4, wherein said fuel cell maximum power point judging-and-storing unit is configured so as to judge the output power becomes a maximum in a successive detection as the maximum power point, when the maximum power point is successively detected while the output voltage is varied.

6. The fuel cell optimum operating point tracking system as claimed in claim 1, wherein the power state is an output voltage of the fuel cell, and the optimum operating point is a maximum power point of the fuel cell, and wherein said fuel cell optimum operating point tracking unit comprises a timer having a specified voltage refreshing interval set therein, configured so as to measure the output voltage of the fuel cell by clearing, after an elapse of said specified voltage refreshing interval, stored values of the maximum power point and the output voltage corresponded thereto upon activation of said fuel cell, and by varying the output voltage of said fuel cell up to as high as maximum voltage for maximum power point tracking control.

7. The fuel cell optimum operating point tracking system as claimed in claim 1, wherein the power state is an output voltage of said fuel cell, and said fuel cell optimum operating point tracking unit comprises a power source activation detecting unit capable of detecting an activation of the power source device, and wherein the fuel cell output power measuring unit measures the output voltage as the power state, while varying the output voltage of the fuel cell upon the activation thereof, up to as high as maximum voltage for the maximum power point tracking control.

8. The fuel cell optimum operating point tracking system as claimed in claim 1, wherein said fuel cell optimum operating point tracking unit comprises an optimum operating point variation command unit capable of tracking the optimum operation point, by monitoring the power state at a fuel cell output power maximum point upon activation of said fuel cell, and by effecting the maximum power monitoring by changing the power state of the fuel cell by a minimal value from around current operating state.

9. The fuel cell optimum operating point tracking system as claimed in claim 1, further comprising an intermittent operation preventive unit capable of monitoring, during an operation of said power source device, the output voltage of the fuel cell, and of outputting an output interruption voltage, upon lowering of the output voltage of the fuel cell to a fuel cell output interruption voltage or below, to thereby turn said power source device into interruption state.

10. The fuel cell optimum operating point tracking system as claimed in claim 9, wherein said intermittent operation preventive unit comprises a fuel cell output interruption judging unit capable of judging whether an output of the fuel cell is interrupted or not, when the output voltage of the fuel cell drops to the fuel cell output interruption voltage or below during an operation of said fuel cell optimum operating point tracking unit.

11. The fuel cell optimum operating point tracking system as claimed in claim 9, wherein said intermittent operation preventive unit comprises a timer unit capable of controlling the intermittent operation when an output of the fuel cell is interrupted during operation of said fuel cell maximum power search unit.

12. The fuel cell optimum operating point tracking system as claimed in claim 11, wherein said timer unit is configured so as to interrupt said fuel cell, to set a restart wait time, to measure the output voltage of said fuel cell after an elapse of the restart wait time, and to output an operation output signal if the output voltage reaches or exceeds a restart voltage to thereby activate said fuel cell.

13. The fuel cell optimum operating point tracking system as claimed in claim 9, wherein said intermittent operation preventive unit comprises a fuel cell output start judging unit capable of judging whether restart of the operation of the fuel cell interrupted during the operation of said fuel cell optimum operating point tracking unit is allowable or not.

14. The fuel cell optimum operating point tracking system as claimed in claim 1, further comprising a fuel cell optimum operating point tracking and retaining unit capable of widening a specified voltage refreshing interval, when variation in the output voltage of said fuel cell falls below the amount of variation of set voltage within a predetermined time period.

15. The fuel cell optimum operating point tracking system as claimed in claim 14, wherein said fuel cell optimum operating point tracking and retaining unit comprises a fuel cell output voltage control value variation judging unit capable of judging whether the output voltage variation of said fuel cell falls below, or exceeding the amount of variation of set voltage within a predetermined time period.

16. The fuel cell optimum operating point tracking system as claimed in claim 14, wherein said fuel cell optimum operating point tracking and retaining unit comprises a timer unit capable of operating so as to activate said fuel cell optimum operating point tracking unit, by widening the specified voltage refreshing interval, if the output voltage variation of said fuel cell falls below the amount of variation of set voltage within a predetermined time period, and by initializing said specified voltage refreshing interval, if the output voltage variation of said fuel cell exceeds the amount of variation of set voltage within a predetermined time period.

17. The fuel cell optimum operating point tracking system as claimed in claim 14, wherein said fuel cell optimum operating point tracking and retaining unit is configured so as to set a reference unit time, to count the number of times the output voltage variation of said fuel cell falls below said amount of variation of set voltage within every reference unit time, and to determine a state of fall below the amount of variation of set voltage within said predetermined time period by the fact that a specified number of count has successively been met.

18. The fuel cell optimum operating point tracking system as claimed in claim 17, wherein said fuel cell optimum operating point tracking and retaining unit comprises a counter capable of setting the reference unit time, and of counting an event in which the output voltage variation of said fuel cell falls below said amount of variation of set voltage within every reference unit time.

19. A power source unit comprising the fuel cell optimum operating point tracking system as claimed in claim 1, wherein said fuel cell optimum operating point tracking system is used in the power source device powered by the fuel cell, configured so as to improve responsiveness thereof by monitoring the power state while varying the output voltage of said fuel cell, and by allowing said fuel cell to start an operation at an input voltage corresponded to a maximum power point thereof, comprising:

said fuel cell maximum power search unit capable of tracking an optimum operating point through maximum power monitoring, by allowing said fuel cell maximum power search unit to periodically operate so as to monitor the power state to thereby keep the power source operation constant at a stable condition, and additionally giving a minimal voltage change at around the current operating voltage value.

* * * * *